(12) United States Patent
Gebhardt

(10) Patent No.: US 9,005,323 B2
(45) Date of Patent: Apr. 14, 2015

(54) ABRASIVE GRAINS BASED ON ZIRCONIA ALUMINA

(75) Inventor: Knuth Gebhardt, Klagenfurt (AT)

(73) Assignee: Center for Abrasives and Refractories Research & Development C.A.R.R.D. GmbH, Villach (AT)

( * ) Notice: Subject to any disclaimer, the term of this patent is extended or adjusted under 35 U.S.C. 154(b) by 153 days.

(21) Appl. No.: 13/695,875

(22) PCT Filed: May 10, 2010

(86) PCT No.: PCT/EP2010/002882
§ 371 (c)(1),
(2), (4) Date: Dec. 11, 2012

(87) PCT Pub. No.: WO2011/141037
PCT Pub. Date: Nov. 17, 2011

(65) Prior Publication Data
US 2013/0067828 A1    Mar. 21, 2013

(51) Int. Cl.
| C09K 3/14 | (2006.01) |
| C04B 35/48 | (2006.01) |
| C04B 35/01 | (2006.01) |
| C04B 35/109 | (2006.01) |
| C04B 35/10 | (2006.01) |
| C04B 35/111 | (2006.01) |

(52) U.S. Cl.
CPC ............. *C09K 3/1427* (2013.01); *C04B 35/013* (2013.01); *C04B 35/109* (2013.01); *C04B 2235/3225* (2013.01); *C04B 2235/3232* (2013.01); *C04B 2235/3248* (2013.01); *C04B 2235/3418* (2013.01); *C04B 2235/402* (2013.01); *C04B 2235/76* (2013.01); *C04B 2235/762* (2013.01); *C04B 2235/765* (2013.01)

(58) Field of Classification Search
CPC ........ C09K 3/14; B24D 18/00; C04B 35/119; C04B 35/486; C04B 35/48; C04B 35/46; C04B 35/111; C04B 35/505
See application file for complete search history.

(56) References Cited

U.S. PATENT DOCUMENTS

| 4,457,767 A | 7/1984 | Poon et al. |
| 5,248,318 A | 9/1993 | Tamamaki et al. |
| 5,525,135 A | 6/1996 | Möltgen et al. |
| 6,582,488 B1 * | 6/2003 | Rosenflanz ............ 51/309 |
| 6,666,750 B1 * | 12/2003 | Rosenflanz .......... 451/28 |
| 7,011,689 B2 | 3/2006 | Aleonard et al. |
| 7,122,064 B2 | 10/2006 | Dazza et al. |
| 2004/0040218 A1 | 3/2004 | Aleonard et al. |
| 2006/0272221 A1 | 12/2006 | Dazza et al. |
| 2008/0028685 A1 | 2/2008 | Marlin |

FOREIGN PATENT DOCUMENTS

| EP | 0 480 678 A2 | 4/1992 |
| EP | 0 593 977 A1 | 4/1994 |
| JP | 59-227726 | 12/1984 |
| JP | 04-146987 | 5/1992 |
| WO | WO 02-46326 A1 | 6/2002 |
| WO | WO 2011-015995 A2 | 2/2011 |
| WO | WO 2011-141037 A1 | 11/2011 |

OTHER PUBLICATIONS

International Search Report issued Jan. 21, 2011, in International Application No. PCT/EP2010/002882, filed May 10, 2010.
Howard, C. J.; and Hill, R. J., "The polymorphs of zirconia: phase abundance and crystal structure by Rietveld analysis of neutron and X-ray diffraction data", Journal of Materials Science, vol. 26, 1991, pp. 127-134.
Martin, U.; Boysen, H.; and Frey, F., "Neutron Powder Investigation of Tetragonal and Cubic Stabilized Zirconia, TZP and CSZ, at Temperatures up to 1400 K", Acta Cryst., 1993, B49, pp. 403-413.
Bondars, B.; Heidemane, G.; Grabis, J.; Laschke, K.; Boysen, H.; Schneider, J.; and Frey, F., "Powder diffraction investigations of plasma sprayed zirconia", Journal of Materials Science, vol. 30, 1995, pp. 1621-1625.
Gualtieri, A.; Norby, P.; Hanson, J.; and Hriljac, J., Rietveld Refinement using Synchrotron X-ray Powder Diffraction Data Collected in Transmission Geometry using an Imaging-Plate Detector: Application to Standard $m$-$ZrO_2$ Journal Appl. Crystallography, vol. 29, 1996, pp. 707-713.
Office Action issued in related Japanese Application No. 2013-509451, dated Feb. 12, 2014.
Office Action issued in related Chinese Application No. 201080066230.8, dated Nov. 5, 2013.

* cited by examiner

*Primary Examiner* — Pegah Parvini
(74) *Attorney, Agent, or Firm* — Finnegan, Henderson, Farabow, Garrett & Dunner, L.L.P.

(57) ABSTRACT

Disclosed herein are abrasive grains based on zirconia alumina melted in an electric arc furnace, comprising a content of 52 to 62 wt % $Al_2O_3$ and 35 to 45 wt % $ZrO_2$, wherein the high-temperature phases of the zirconia are stabilized by a combination of reduced Ti compounds and yttrium oxide.

11 Claims, 2 Drawing Sheets

ABRASIVE GRAINS BASED ON ZIRCONIA ALUMINA

This application is a U.S. national stage entry under 35 U.S.C. §371 from PCT International Application No, PCT/EP2010/002882, filed May 10, 2010, to which this application claims the benefit of priority, and the entirety of the subject matter of which is incorporated herein by reference.

The present invention relates to abrasive grains based on zirconium corundum melted in an electric arc furnace, having the features of the introductory part of claim 1.

Ceramic particles of this type that are produced by extremely rapid cooling of a melt of aluminium oxide and zirconium oxide have been known for many years and are successfully used as abrasive grains and/or refractory materials. In particular with use as abrasive grains, it has been shown that high weight contents of the tetragonal high-temperature modification of zirconium oxide in the product have an advantageous effect on the quality and the stock removal rate of the abrasive grains. The high-temperature modification of zirconium oxide in the melted zirconium corundum is usually obtained by rapid quenching of the melt of aluminium oxide and zirconium oxide in the presence of commonly known metal oxides that act as stabilizers for the high-temperature modification, such as e.g. titanium oxide, yttrium oxide, magnesium oxide, calcium oxide or others.

Thus, in U.S. Pat. No. 5,525,135 (EP 0 595 081 B1), an abrasive grain based on zirconium corundum is described in which more than 90% by weight of the zirconium oxide are present in the tetragonal high-temperature modification. The stabilization of the high-temperature phase takes place in this case by adding titanium oxide in the presence of carbon as a reducing agent in the liquid melt and then rapidly quenching the melt. This produces reduced titanium compounds in the form of suboxides, carbides and/or oxycarbides, with the stabilization of the high-temperature phases of the zirconium oxide occurring probably via the suboxides of the titanium.

In U.S. Pat. No. 7,122,064 B2 (EP 1 341 866 B1), abrasive grains based on zirconium corundum are described in which the high-temperature phases of zirconium oxide are likewise stabilized with titanium compounds in reduced form, in particular in the form of oxides, suboxides, carbides and/or oxycarbides. The abrasive grains described in EP 1 341 866 B1 additionally contain silicon compounds at a content of between 0.2 and 0.7% by weight, expressed as $SiO_2$. Although the stabilizing effect of the reduced titanium compounds is significantly reduced by the addition of $SiO_2$, the viscosity of the melt is also greatly reduced at the same time, thus facilitating the quenching of the melt, in the process of which the liquid material is poured between metal plates. This has a positive effect on the structure of the finished abrasive grain, so that in this way a particularly fine crystalline and homogeneous structure can be achieved which, beside the highest possible weight content of the high-temperature modification of zirconium oxide, is another important criterion for the product quality.

In U.S. Pat. No. 4,457,767, an abrasive zirconium corundum grain is described that contains between 0.1 and 2% by weight of yttrium oxide, which is known as a stabilizer for the high-temperature modifications of zirconium oxide. It is known that the stabilizing effect of $Y_2O_3$ for the high-temperature phases of zirconium oxide is more pronounced than that of reduced $TiO_2$, and comparatively less $Y_2O_3$ therefore needs to be used in order to obtain comparable weight contents of the high-temperature phases.

Abrasive grains based on zirconium corundum today are still among the most important conventional abrasive grains for machining a large variety of different grades of steel, and great efforts are therefore being made worldwide to improve the performance of the abrasive grains.

Thus, in U.S. Pat. No. 7,011,689 B2, melted zirconium corundum ceramic grains are described which preferably contain 35 to 50% by weight zirconium oxide, 48 to 65% by weight aluminium oxide, less than 0.4% by weight $SiO_2$ and up to 10% by weight of at least one of the oxides of the group consisting of yttrium oxide, titanium oxide and magnesium oxide. Such ceramic grains are melted in the presence of carbon and aluminium metal as reducing agents. Attempts have been made to improve the quality by means of a specific process control, by using an aluminium metal in combination with carbon as reducing agent and operating the electric arc furnace at a voltage of 175 to 205 V with a specific energy of 2.5-4 kWh per kilogram of material used, in order to thereby make the resulting product less susceptible to oxidation. The stabilizers described in U.S. Pat. No. 7,011,689 B2 are yttrium oxide, titanium oxide and magnesium oxide, and the conclusion was reached that preference should be given to the embodiments stabilized with yttrium (column 16, lines 16-18). A combination of titanium oxide and yttrium oxide as stabilizers is described in Example 22 for a material having a zirconium oxide content of 28.1% by weight. The ratio of titanium oxide to yttrium oxide in this case is approximately 4:1. The yttrium oxide content of 0.25% by weight is a very low concentration that it is known to have only an extremely small stabilizing effect. Particular advantages of this combination are not specified; on the contrary, the product is described as falling outside the invention due to its porosity.

U.S. Patent No. 2008/0028685 A1 describes a mixture of melted zirconium corundum grains that contain 40 to 45.5% by weight zirconium oxide, 46 to 58% by weight aluminium oxide, up to 10% by weight additives, less than 0.8% by weight $SiO_2$ and less than 1.2% by weight impurities. The zirconium corundum grains stand out in that they contain less than 2% inclusions and in that the concentration of globular nodules, measured on a cut surface of a random grain of this mixture, is more than 500 nodules per mm in at least 50% of the cases. The possible additives specified are yttrium oxide, titanium oxide, magnesium oxide and calcium oxide, neodymium, lanthanum, ceric, dysprosium and erbium oxide, or any other compound from the family of the rare earths or mixtures thereof, the amount of additives being quantified in claim 20, and yttrium oxide at 0.1 to 1.2% by weight and/or titanium oxide at 0.1 to 3% by weight and/or silicon oxide at less than 0.4% by weight in the presence of zirconium oxide at 42 to 44% by weight being described explicitly as possible additives. However, no combination of these additives is specified or emphasized.

The specific creation of nodules and inclusions by which the zirconium corundum grains are characterized is not the subject of the above cited document, rather the products are produced in the conventional manner from the usual raw materials in the melt and the so-obtained grains are then analyzed, in the process of which, in addition to other investigations, the concentration of nodules and inclusions is visually analyzed on polished sections.

Since it is known that the structure of zirconium corundum influences its performance, it was attempted in this way to characterize the structure by the existing nodules and inclusions, in order to be able to, in this way, sort out grain mixtures that have a structure characterized by a certain number of, or concentration of, nodules and inclusions and that, by virtue of this structure, give reason to expect a certain performance level. The present document therefore in principle describes a new type of outbound quality control for a familiar product.

A combination of yttrium oxide with titanium oxide is known from EP 0 480 678 A2, in which, on page 6 in Table 1, an abrasive grain (Example E) is described that has a chemical composition containing 57% by weight aluminium oxide, 39.5% by weight zirconium oxide, 0.5% by weight yttrium oxide and 2.12% by weight titanium oxide. The aim of the application is to produce a lapping abrasive based on zirconium corundum that should have a tetragonal phase content of maximally 30% by weight, based on the total weight content of zirconium oxide. The product is melted under oxidizing conditions and subjected after quenching from the melt to a temperature treatment in air, in order to obtain by conversion of the high-temperature phases of the zirconium oxide to the monoclinic phase, which is thermodynamically stable at room temperature, a product in which the zirconium oxide weight content contains less than 30% by weight of the tetragonal phase.

In Japanese Patent No. 1 614 974, titanium-oxide and yttrium-oxide-containing zirconium corundums are described that have high contents of zirconium oxide in the tetragonal high-temperature phase. However, the product described in the document is not produced under reducing conditions. Thus, it is apparent from the examples shown in Tables 8 and 9 that the titanium oxide present in the product does not exhibit any effect on the stabilization of the tetragonal high-temperature phase. A product (Example 14) containing approximately 6% by weight titanium oxide has, for example, a content of only of 34.2% by weight of tetragonal zirconium oxide, based on the total weight content of zirconium oxide.

Therefore, the prior art can be summarized as follows: from EP 1 341 866 B1, high-performance abrasive grains based on $Al_2O_3$ and $ZrO_2$ melted in an electric arc furnace are known in which the high-temperature phase of zirconium oxide is stabilized using reduced titanium compounds. From U.S. Pat. No. 4,457,767, comparable high-performance zirconium corundums are known that are doped with 0.1 to 2% by weight yttrium oxide, by means of which the high-temperature modification of zirconium oxide is stabilized. In addition, compositions are known in which titanium oxide is used in addition to yttrium oxide, but either the stabilization comes solely from the yttrium oxide because the production did not occur under reducing conditions, or the production conditions are selected such that only very low weight contents of tetragonal phase occur at all.

Although titanium oxide and yttrium oxide are mentioned side by side as stabilizers even in the more recent patent literature, this matter has never been pursued or taken up by anyone skilled in the art, since there were no indications that it would be possible to achieve improvements to the product for such a combination. Thus, even in the more recent patent literature cited at the beginning, no attempts in this direction are described.

The applicant of the present invention, in its efforts to improve the performance of abrasive zirconium corundum grains, has examined the mode of action of the different stabilizers in greater detail. For this purpose the phase distribution of zirconium oxide in fusion cast zirconium corundums was studied for the first time with the so-called Rietveld method. This method is based on X-ray powder diffractometry and enables a quantitative determination of the different phases of a compound by the reflection intensities obtained. The particular advantage of the Rietveld method in the case of zirconium corundum lies in that it is possible with this method to quantitatively analyze the phase distribution relatively accurately and, above all, distinguish between the cubic and the tetragonal high-temperature phase of zirconium oxide.

In the above-cited patent literature the weight contents of the high-temperature phases are indeed also determined by X-ray diffraction, but only intensities of three peaks in the range between 28° and 32° (2Θ) are used as a basis for the quantitative analysis. This analysis has the shortcoming that it is less accurate and does not distinguish between the cubic and the tetragonal high-temperature phase, since the peak at approximately 30° (2Θ) examined for the high-temperature phases results from a nearly complete overlap of the respective individual reflections of the two high-temperature phases [see also C. J. Howard, R. J. Hill; Journal of Materials Science, 26 (1991)]. In the above-cited patent literature it is therefore almost exclusively the tetragonal phase that is described as the high-temperature phase. In the few documents in which the cubic phase is mentioned in addition to the tetragonal phase, no information can be found on how the phases were determined.

Figure 1:
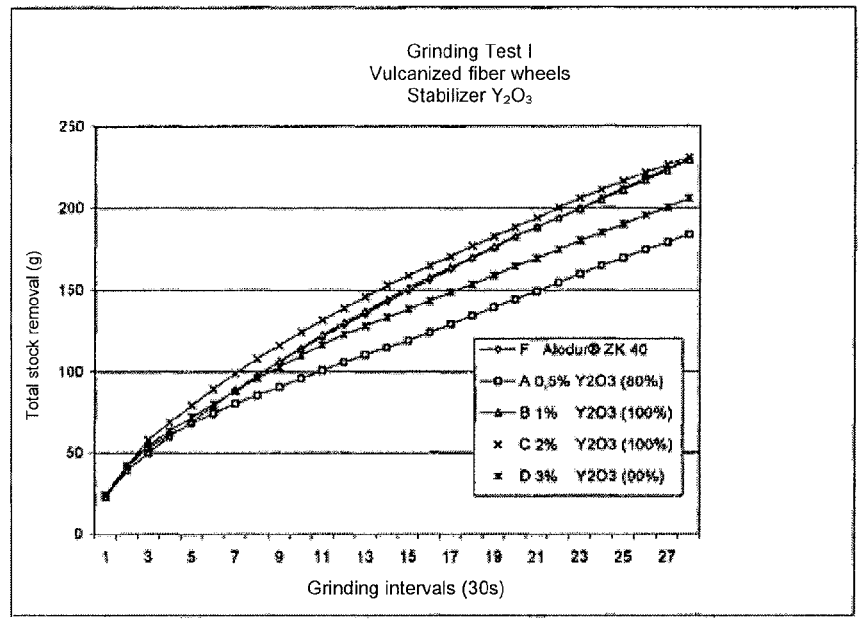
FIG. 1 is a graph showing the total stock removal (g) versus time (intervals of 30 seconds) for different zirconium corundums stabilized with $Y_2O_3$.

In contrast to the conventional method, with the Rietveld analysis the entire measurement range [between 20° and 80° (2Θ) for the measurement results used here] is used for the quantitative analysis of the composition, and the measured reflection intensities and reflection angles are compared with a theoretical calculation of the expected crystal phases. When there is good agreement it may be assumed that the quantitative analysis is sufficiently confirmed.

Surprisingly, it has been found in these studies that the two stabilizers $Y_2O_3$ and reduced $TiO_2$ in the case of zirconium corundum melted in an electric arc furnace differ not only in their effectiveness, but also in their mode of action. Thus, in the stabilization using reduced titanium oxide compounds, relatively high weight contents of the cubic phase are obtained, while yttrium as a stabilizer under the melting conditions of zirconium corundum yields predominantly the tetragonal high-temperature phase.

Proceeding from this finding, different concentrations and combinations of the individual stabilizers and their effectiveness were then examined specifically. The main results of these investigations are summarized in the following examples and in FIGS. 1 to 3.

EXAMPLE 1

Preparation of the Samples

In order to prepare the samples for the analyses, approximately 400 kg each of a mixture of alumina (AC 34, Rio Tinto Alcan, Gardanne), baddeleyite concentrate (Kovdorsky GOK), zircon sand (Coferal Minerals GmbH/composition: 66% by weight $ZrO_2$, 32% by weight $SiO_2$, 1.2% by weight $Al_2O_3$) and petroleum coke were melted with different amounts of rutile sand (Coferal Minerals GmbH/composition: 96% $TiO_2$, 1.5% $SiO_2$) and/or yttrium oxide (Treibacher Industrie AG) in a three-phase electric arc furnace at a voltage of 91 V and an input power of 1400 kW. After melting of the entire raw material mixture (approximately 1 hour), each melt was poured into a gap of approximately 3 to 5 mm between metal plates, according to EP 0 593 977. The so-quenched zirconium corundum plates, after having cooled down completely, were reduced to small pieces in the usual manner by means of jaw crushers, roller crushers, roller mills or cone crushers and sieved to the desired grain size fractions. In addition to petroleum coke, Al metal may advantageously be used as a reducing agent, in which case a portion of the petroleum coke is replaced with Al metal.

The percentage compositions of the individual mixtures for the different samples produced in the context of the present application are summarized in Table 1.

TABLE 1

| | Chemical composition of the mixtures (% by weight) | | | | | |
|---|---|---|---|---|---|---|
| Sample | Alumina | Baddeleyite | Zircon sand | Petrol coke | Rutile sand | $Y_2O_3$ |
| A | 54.5 | 35.0 | 8.0 | 2.0 | — | 0.5 |
| B | 54.0 | 35.0 | 8.0 | 2.0 | — | 1.0 |
| C | 53.5 | 34.5 | 8.0 | 2.0 | — | 2.0 |
| D | 53.0 | 34.0 | 8.0 | 2.0 | — | 3.0 |
| E | 53.5 | 34.5 | 8.0 | 2.0 | 2.0 | — |
| F | 53.0 | 34.0 | 8.0 | 2.0 | 3.0 | — |
| G | 52.5 | 33.5 | 8.0 | 2.0 | 4.0 | — |
| H | 53.0 | 34.5 | 8.0 | 2.0 | 2.0 | 0.5 |
| I | 52.0 | 33.5 | 8.0 | 2.0 | 3.0 | 0.5 |
| J | 53.0 | 34.0 | 8.0 | 2.0 | 2 | 1 |
| K | 52.5 | 33.5 | 8.0 | 2.0 | 3 | 1 |
| L | 52.0 | 33.0 | 8.0 | 2.0 | 4 | 1 |
| M | 53.0 | 34.0 | 8.0 | 2.0 | 1 | 2 |
| N | 52.5 | 33.5 | 8.0 | 2.0 | 1 | 3 |

EXAMPLE 2

Rietveld Analyses

For the Rietveld analyses, smaller specimens of each sample were subjected to a reduction to small pieces in a vibrating mill, to a fraction size of <45 µm. Each powder was then applied onto a flat sample holder for an X-ray diffractometer. The X-ray diffractometer used was a Bruker D8 Advance (Bruker AXS GmbH). The measurements were performed in the range between 20° to 80° (2Θ) with a step width of 0.02° per 80 seconds while rotating the sample. A commercially available X-ray tube with a copper anode was used as the radiation source and the measurements were performed without a monochromator, using Cu $K_{\alpha/\beta}$ radiation. Data from the literature was used as the starting models for the Rietveld calculations. Thus, the data for monoclinic zirconium oxide came from the Journal of Applied Crystallography, 29, (1996), 707-713; that for cubic zirconium oxide from Acta Crystallographica B, 39, (1983), 86; and that for tetragonal zirconium oxide from the Journal of Materials Science, 30, (1995), 1621-1625.

EXAMPLE 3

Grinding Tests

Concurrently with the quantitative calculations of the phase distribution, grinding tests were performed with the corresponding samples, in the process of which the material was tested in vulcanized fiber wheels and in cut-off wheels.

Grinding Test I (Vulcanized Fiber Wheels)

For the manufacture of the wheels, commercially available vulcanized fiber wheels with a thickness of 0.8 mm were coated, using a doctor blade, with a binder base layer composed of 56% by weight phenolic resin (Hexion Specialty Chemicals GmbH), 40% by weight calcium carbonate and 6% by weight water. The abrasive grain (pure zirconium corundum of sieved grain size NP 40) was scattered onto the wheels electrostatically at a spreading density of approximately 650 g/m³. After drying or curing of the base layer, a top layer consisting of 54% by weight phenolic resin (Hexion Specialty Chemicals GmbH), 20% by weight calcium carbonate, 20% by weight $KBF_4$ and 6% by weight water was applied. The wheels were dried and cured according to the manufacturer's instructions. After twelve hours of storage in a climatic chamber the wheels are made more flexible and punched out to the proper final size using a circular template.

In the grinding tests, round steel bars made of stainless steel X5CrNi18-10 (material number 1.4301) with a diameter of 20 mm were used, the rods being moved against the wheel at a right angle using a constant contact pressure of 16 N/cm². The radial velocity of the wheel on the tool was on average 30 m/s, the workpiece being moved on the wheel alternatingly towards the center and away from the center at 25 mm/sec. To prevent premature overheating of the workpiece, the contact point between the workpiece and the wheel was cooled using compressed air.

The results of the Rietveld analyses and the grinding results for the single-doped samples are summarized in Table 2 below.

Figure 2:
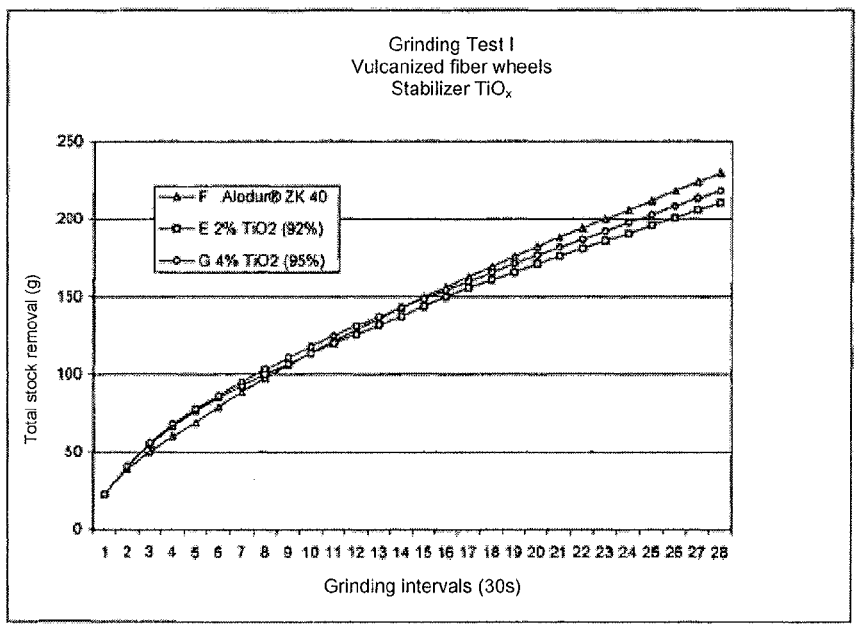
FIG. 2 is a graph showing the total stock removal (g) versus time (intervals of 30 seconds) for different zirconium corundums stabilized with $TiO_2$.
Figure 3:
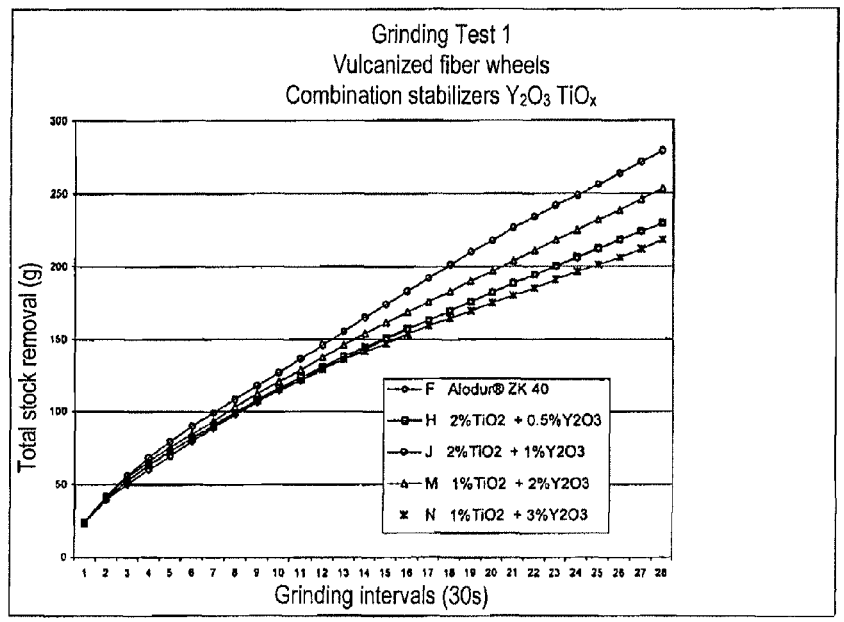
FIG. 3 is a graph showing the total stock removal (g) versus time (intervals of 30 seconds) for different zirconium corundums stabilized with different combinations of $Y_2O_3$ and $TiO_2$.

The grinding results from Table 2 are additionally shown in the form of graphs in FIGS. 1 and 2, with FIG. 1 showing the total stock removal (g) plotted against time (intervals of 30 seconds each) for different zirconium corundums stabilized with $Y_2O_3$, and FIG. 2 showing the analogous results for different zirconium corundums stabilized with $TiO_2$.

TABLE 2

| | Doping (% by weight, based on the total abrasive grain) | | Phase distribution of zirconium oxide (% by weight, based on the total weight content of $ZrO_2$) | | | | Quantity of stock removed/ stock removal performance after 28 intervals of 30 seconds | |
|---|---|---|---|---|---|---|---|---|
| | | | Rietveld Method | | | Conv. | each | |
| Sample | $TiO_2$ | $Y_2O_3$ | K* | T** | M*** | K + T | K + T | g | (%) |
| A | — | 0.5 | 5 | 45 | 50 | 50 | 75 | 183.9 | 80 |
| B | — | 1.0 | 10 | 65 | 25 | 75 | 90 | 229 | 100 |
| C | — | 2.0 | 15 | 75 | 10 | 90 | 100 | 230.7 | 100 |
| D | — | 3.0 | 18 | 82 | 0 | 100 | 100 | 205.8 | 90 |
| E | 2.0 | — | 20 | 30 | 50 | 50 | 89 | 210.5 | 92 |
| F | 3.0 | — | 25 | 41 | 34 | 66 | 96 | 229.7 | 100 |
| G | 4.0 | — | 60 | 22 | 18 | 82 | 100 | 218.1 | 95 |

Legend for Table 2:
K* = cubic zirconium oxide
T** = tetragonal zirconium oxide
M*** = monoclinic zirconium oxide
B = corresponds to the commercially available NZ Plus ® (Saint-Gobain Grains and Powders) in terms of $Y_2O_3$ weight content
F = corresponds to the commercially available Alodur ® ZK40 (Treibacher Schleifmittel)

First, it should be noted generally that the values for the high-temperature phases that are determined with the Rietveld method are below the values that are determined with the conventional method, which can probably be attributed to the fact that in the Rietveld method the entire measurement range is covered mathematically, whereas in the conventional method only three selected particularly intense peaks are used for the quantitative determination. Therefore, the weight contents of the high-temperature phases described in the literature for zirconium corundum melted in an electric arc furnace cannot be compared directly with those that have now been determined by means of the Rietveld method.

From the prior art it is known that the stabilizing effect of yttrium oxide is more pronounced than that of reduced titanium compounds, which is readily apparent also from the results in Table 2. Surprisingly, it has now additionally been found that the two stabilizers differ not only in their effectiveness, but also in their mode of action. Thus, relatively high weight contents of the cubic phase are obtained in the stabilization using reduced titanium oxide compounds, whereas yttrium oxide as a stabilizer under the melting conditions of zirconium corundum yields predominantly the tetragonal high-temperature phase.

For the single-doped samples, the grinding tests provided the clear result that by adding a certain amount of stabilizer, an optimum is reached and any further addition is counter-productive and no further increase in the grinding performance can be achieved, even if the weight contents of the high-temperature phases continue to be increased in the process. This was found for both yttrium oxide and titanium oxide, with differing optimal parts by weight. Thus, the optimum for yttrium oxide is between 1.0 and 2.0% by weight, while the optimum for reduced titanium oxide is between 3.0 and 3.5% by weight. Any further addition of the same stabilizer results in a deterioration of the product in both cases, which can possibly be explained with the increased concentration of foreign ions in the zirconium corundum deteriorating the crushing resistance and thus resulting in a more rapid loss of cutting ability of the abrasive grain in the grinding test.

Once it was discovered that the respective stabilizers exhibit differing effects, combinations of the two different stabilizers were also specifically tested in the context of these investigations for the first time, and in the process it was found, surprisingly, that in a range in which an optimum is reached for an individual stabilizer in terms of the effect achieved on the performance as abrasive grain, further increase of the total amount of stabilizer is not only harmless, but even has a positive effect on the performance of the abrasive grain if the additional amount of stabilizer comes from a second, different stabilizer type. The corresponding results are summarized in Table 3.

TABLE 3

| Sample | Doping (% by weight, based on the total abrasive grain) | | Phase distribution according to Rietveld (% by weight, based on the total weight content of $ZrO_2$) | | | | Quantity of stock removed/stock removal performance after 28 intervals of 30 seconds each | |
|---|---|---|---|---|---|---|---|---|
| | $TiO_2$ | $Y_2O_3$ | K | T | M | K+T | (g) | (%) |
| H | 2 | 0.5 | 20 | 50 | 30 | 70 | 229.7 | 100 |
| I | 3 | 0.5 | 25 | 48 | 27 | 73 | 241.5 | 105 |
| J | 2 | 1 | 25 | 60 | 15 | 95 | 279 | 121 |
| K | 3 | 1 | 28 | 66 | 5 | 98 | 305.7 | 133 |
| L | 4 | 1 | 32 | 66 | 2 | 98 | 261.8 | 114 |
| M | 1 | 2 | 20 | 73 | 7 | 93 | 253.3 | 110 |
| N | 1 | 3 | 20 | 80 | 0 | 99 | 218.1 | 95 |

Figure 4:
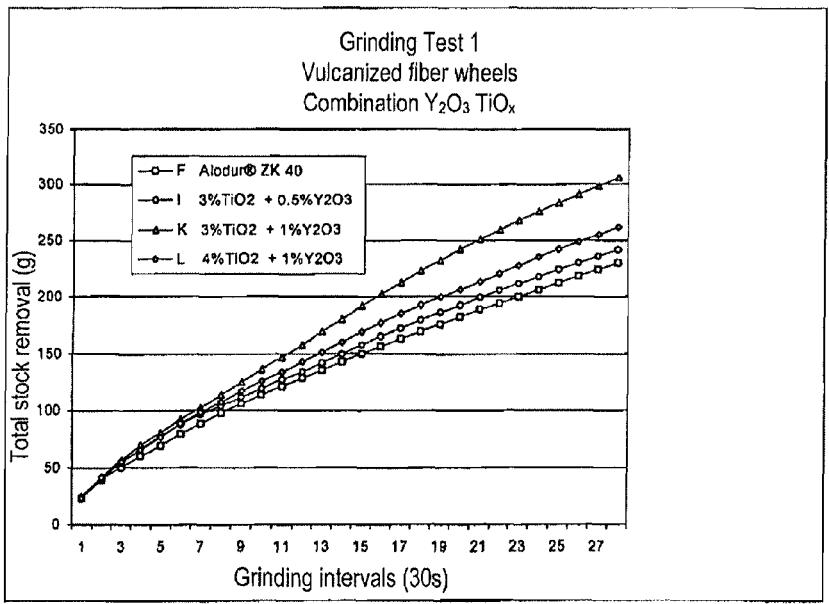
FIG. 4 is a graph showing the total stock removal (g) versus time (intervals of 30 seconds) for different zirconium corundums stabilized with different combinations of $Y_2O_3$ and $TiO_2$.

Legend for Table 3:
K* = cubic zirconium oxide
T** = tetragonal zirconium oxide
*** = monoclinic zirconium oxide The grinding results listed in Table 3 are shown in the form of graphs in FIGS. 3 and 4.

From the table and from the graphs it can be seen that the performance of an abrasive grain that is stabilized with approximately 3% by weight reduced titanium oxide compounds, can be increased by more than 30% by adding 1% by weight yttrium oxide. A definite explanation for this unexpected synergy effect of the two different stabilizers, which emerges in particular when the reduced titanium oxide compounds predominate, has not been found so far.

Cut-Off Wheel Test

In order to ensure the accuracy of the results found, additional cut-off wheel tests were performed.

For this series of tests, cut-off wheels of the specification R-T1 180×3×22.5 were chosen. First, a pressing mixture consisting of 75% by weight zirconium corundum of grain size F36, 5% by weight liquid resin, 12% by weight powder resin from HEXION Specialty Chemicals GmbH, 4% by weight pyrite and 4% by weight cryolite was prepared. For the production of the wheels, 160 g of the pressing mixture were molded onto a commercially available fabric material and pressed at 200 bar and cured according to the resin manufacturer's instructions.

For the grinding test, round steel bars made of stainless steel X5CrNi18-10 (material number 1.4301) with a diameter of 20 mm were used. The cutting operations were performed at a wheel speed of 8,000 revolutions per minute and with a cutting time of 3 seconds. After 12 cuts the wheel wear was determined based on the reduction in diameter of the wheels. The G ratio value was calculated from the ratio of material removal and wheel wear.

TABLE 4

| Sample | Doping (% by weight, based on the total abrasive grain) | | | G ratio value | |
|---|---|---|---|---|---|
| | $TiO_2$ | $Y_2O_3$ | | | |
| B | — | 1.0 | | 4.9 | 100% |
| F | 3.0 | — | | 5 | 102% |
| H | 2 | 0.5 | | 5.2 | 106% |
| I | 3 | 0.5 | | 5.4 | 110% |
| J | 2 | 1 | | 5.8 | 118% |
| K | 3 | 1 | | 6.2 | 126% |
| N | 1 | 3 | | 4.7 | 96% |

It can thus be stated that the grinding performance of abrasive grains based on $Al_2O_3$ and $ZrO_2$ melted in an electric arc furnace that have a content of $Al_2O_3$ between 52 and 62% by weight and a content of $ZrO_2$ between 35 and 45% by weight can be significantly improved when—expressed as $TiO_2$—between 1 and 5% by weight of titanium compounds in reduced form, in particular in the form of oxides and/or suboxides and/or carbides and/or oxycarbides and/or oxycarbon nitrides and/or silicides, together with $Y_2O_3$ between 0.5 and 3.0% by weight are used as stabilizers for the high-temperature phases of zirconium oxide in the presence of carbon, the weight ratio of $TiO_2$ to $Y_2O_3$ being in the range of 1:2 to 5:1.

In the corresponding product, altogether at least 70% by weight of the $ZrO_2$, based on the total weight content of $ZrO_2$, are present in the cubic and tetragonal high-temperature modifications, in which context it should be noted that the corresponding values must be determined using the Rietveld method. Additionally, it is advantageous if the raw materials used contain a weight content of $SiO_2$ that is high enough for Si compounds to be present in the product at a content between 0.2 and 0.7% by weight, expressed as $SiO_2$. It should be noted in this context that a high percentage of $SiO_2$ is reduced to SiO and evaporated in the electric arc furnace, and that therefore significantly higher amounts must be present in the starting materials.

The total carbon content in the product is between 0.03 and 0.5% by weight, but between 0.5 and 5% by weight of carbon are advantageously used in the starting mixture as a reducing agent, which is consumed in particular for the reduction of the titanium oxide and much of which evaporates in the process from the melt in the form of CO. An advantageous embodiment of the invention provides that in addition to carbon, aluminium metal is used as a reducing agent, a portion of the carbon being replaced with aluminium metal and preference being given to mixtures in a ratio of 1:1.

In addition to the constituents listed above, the product may additionally contain up to 3.0% by weight of raw material-based impurities without having a negative impact on the product quality.

An advantageous embodiment of the present invention provides that the weight content of titanium compounds, expressed as $TiO_2$, is 1.5% by weight to 4.0% by weight and the weight content of $Y_2O_3$ is 0.5% by weight to 2.0% by weight, based in each case on the weight of the finished abrasive grain, with the weight content of titanium compounds, expressed as $TiO_2$, together with the weight content of $Y_2O_3$ being between 2.0 and 6.0% by weight, preferably between 3.0 and 5.0% by weight, based on the weight of the finished abrasive grain.

The synergy in the combination of the two stabilizers with respect to the grinding performance is particularly pronounced when the weight ratio of $TiO_2:Y_2O_3$ is 2:1 to 4:1.

Particularly good results can be achieved with abrasive grains based on zirconium corundums melted in an electric arc furnace in which more than 20% by weight of the total zirconium oxide are present in the cubic phase and more than 50% by weight of the total zirconium oxide are present in the tetragonal phase, with the determination of the phase distribution being based on the Rietveld method.

What is claimed is:

1. Abrasive grains based on $Al_2O_3$ and $ZrO_2$ melted in an electric arc furnace, having a weight content of:
   $Al_2O_3$ between 52 and 62% by weight,
   $ZrO_2$ between 35 and 45% by weight, with at least 70% by weight of the $ZrO_2$, based on the total weight content of $ZrO_2$, being present in the tetragonal and cubic high-temperature modifications,
   titanium compounds in reduced form, in particular in the form of oxides and/or suboxides and/or carbides and/or oxycarbides and/or oxycarbon nitrides and/or silicides, between 1 and 5% by weight, expressed as $TiO_2$,
   $Y_2O_3$ between 0.5 and 3.0% by weight,
   Si compounds between 0.2 and 0.7% by weight, expressed as $SiO_2$,
   total carbon between 0.03 and 0.5% by weight, and
   raw-material-based impurities of less than 3.0% by weight, characterized in that the weight ratio of $TiO_2$ to $Y_2O_3$ is in the range of 1:2 to 5:1.

2. The abrasive grains according to claim 1, characterized in that the weight content of titanium compounds, expressed as $TiO_2$, is 1.5% by weight to 4.0% by weight and the weight content of $Y_2O_3$ is 0.5% by weight to 2.0% by weight, based in each case on the weight of the finished abrasive grain.

3. The abrasive grains according to claim 1, characterized in that the weight content of titanium compounds, expressed as $TiO_2$, together with the weight content of $Y_2O_3$ is between 2.0 and 6.0% by weight, based on the weight of the finished abrasive grain.

4. The abrasive grains according to claim 1, characterized in that the weight ratio of $TiO_2:Y_2O_3$ is in the range of 2:1 to 4:1.

5. The abrasive grains according to claim 1, characterized in that in the abrasive grains more than 20% by weight of the zirconium oxide is present in the cubic high-temperature phase and more than 50% by weight of the zirconium oxide is present in the tetragonal high-temperature phase, based in each case on the total weight content of zirconium oxide.

6. The abrasive grains according to claim 2, characterized in that the weight content of titanium compounds, expressed as $TiO_2$, together with the weight content of $Y_2O_3$ is between 2.0 and 6.0% by weight, based on the weight of the finished abrasive grain.

7. The abrasive grains according to claim 2, characterized in that the weight ratio of $TiO_2:Y_2O_3$ is in the range of 2:1 to 4:1.

8. The abrasive grains according to claim 3, characterized in that the weight ratio of $TiO_2:Y_2O_3$ is in the range of 2:1 to 4:1.

9. The abrasive grains according to claim 2, characterized in that in the abrasive grains more than 20% by weight of the zirconium oxide is present in the cubic high-temperature phase and more than 50% by weight of the zirconium oxide is present in the tetragonal high-temperature phase, based in each case on the total weight content of zirconium oxide.

10. The abrasive grains according to claim 3, characterized in that in the abrasive grains more than 20% by weight of the zirconium oxide is present in the cubic high-temperature phase and more than 50% by weight of the zirconium oxide is present in the tetragonal high-temperature phase, based in each case on the total weight content of zirconium oxide.

11. The abrasive grains according to claim 4, characterized in that in the abrasive grains more than 20% by weight of the zirconium oxide is present in the cubic high-temperature phase and more than 50% by weight of the zirconium oxide is present in the tetragonal high-temperature phase, based in each case on the total weight content of zirconium oxide.

* * * * *

UNITED STATES PATENT AND TRADEMARK OFFICE
CERTIFICATE OF CORRECTION

| | | |
|---|---|---|
| PATENT NO. | : 9,005,323 B2 | Page 1 of 1 |
| APPLICATION NO. | : 13/695875 | |
| DATED | : April 14, 2015 | |
| INVENTOR(S) | : Knuth Gebhardt | |

It is certified that error appears in the above-identified patent and that said Letters Patent is hereby corrected as shown below:

Title page, item 57, line 3, "$Al_2O_3$" should read -- $Al_2O_3$ --.

Signed and Sealed this
Eleventh Day of August, 2015

Michelle K. Lee
*Director of the United States Patent and Trademark Office*